No. 709,712. Patented Sept. 23, 1902.
J. KOSTÁLEK.
FILTER.
(Application filed Apr. 19, 1902.)
(No Model.) 2 Sheets—Sheet 1.

Witnesses.
Hiroshi Mori
Ludwig Flum

Inventor.
Josef Kostálek
by B. Senger
Att'y.

No. 709,712. Patented Sept. 23, 1902.
J. KOSTÁLEK.
FILTER.
(Application filed Apr. 19, 1902.)
(No Model.)
2 Sheets—Sheet 2.
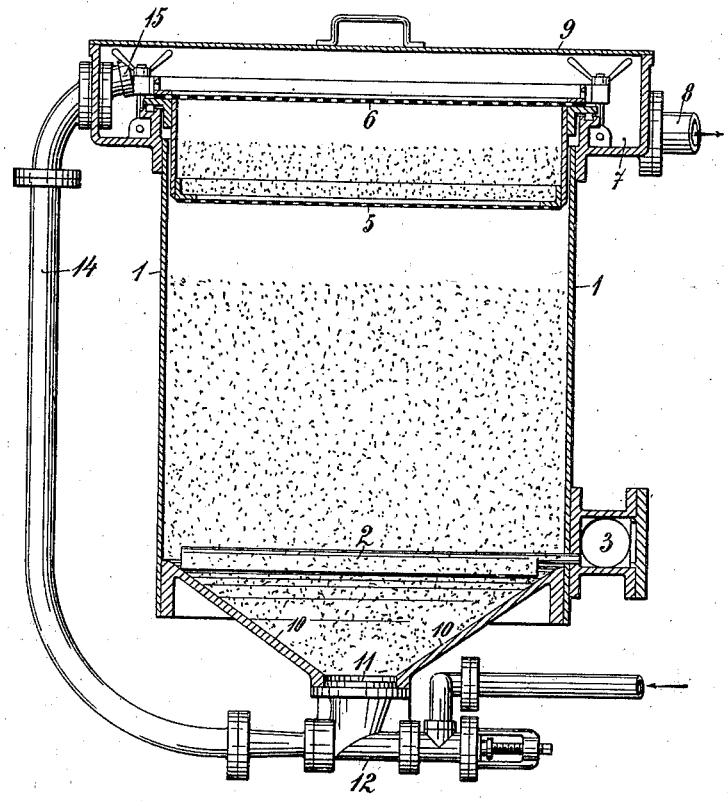
Fig. 3.
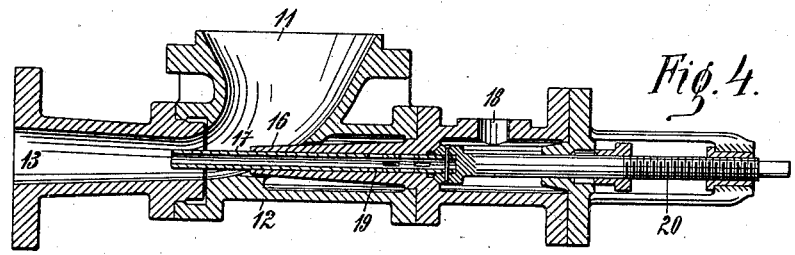
Fig. 4.
Witnesses.
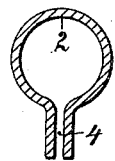 Fig. 5. Fig. 6. 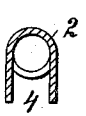
Inventor.
Josef Kostálek
Att'y.

UNITED STATES PATENT OFFICE.

JOSEF KOSTÁLEK, OF PRAGUE-VINOHRADY, AUSTRIA-HUNGARY, ASSIGNOR TO SOCIETY MASCHINENBAU-ACTIENGESELLSCHAFT VORMALS BREITFELD, DANĚK & CO., AKCIOVÁ SPOLECNOST STROJIRNY DRIVE BREITFELD, DANĚK I SPOL., OF KARLIN, BOHEMIA, AUSTRIA-HUNGARY.

FILTER.

SPECIFICATION forming part of Letters Patent No. 709,712, dated September 23, 1902.

Application filed April 19, 1902. Serial No. 103,690. (No model.)

*To all whom it may concern:*

Be it known that I, JOSEF KOSTÁLEK, a subject of the Emperor of Austria-Hungary, residing in Prague-Vinohrady, in the Kingdom of Bohemia, Austria-Hungary, have invented a new and useful Filter Provided with Means for Automatic Washing of the Filtering Material, of which the following is a specification.

My invention relates to improvements in large filters, of which the filtering material is preferably sand, besides other materials, and through which the liquid to be filtered flows with everywhere nearly the same velocity, either from the bottom up to the top or from the top to the bottom and again from the bottom to the top, these filters being provided with sand and water-jet injectors, into which the sand falls directly from the filters, or, rather, is sucked down by the jet of water and forced thereby up through a tube up into the filter again for the purpose of washing it automatically when needed. Thus a perfect and cheap filter may be obtained, especially for the purposes of sugar manufacture and the like, the transport of heavy masses of sand or other filtering materials and the installation of washing machinery is completely unnecessary, and these filtering materials may be kept clean and efficacious as needed without considerable expense of time, work, and money. I attain these objects by the arrangements illustrated in the accompanying drawings, in which—

Figure 1:
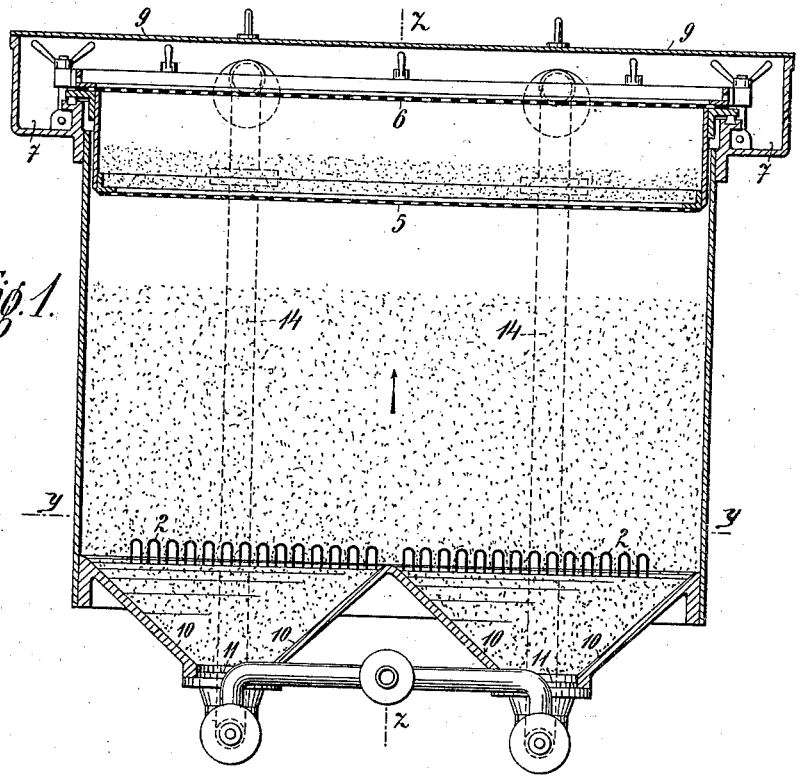
Figure 2:
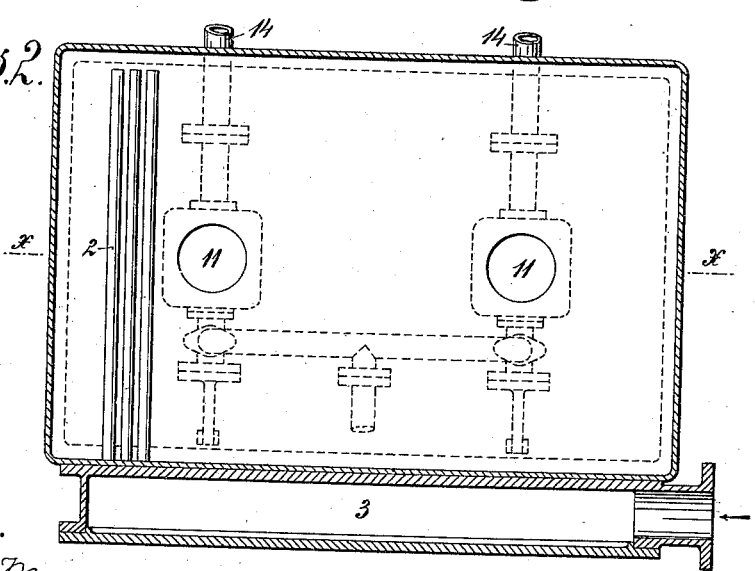

Figure 1 is a vertical section of the entire filter through X X in Fig. 2. Fig. 2 is a horizontal section of the same filter through Y Y in Fig. 1. Fig. 3 is a vertical section through Z Z in Fig. 1. Fig. 4 is an axial section of the injector on an enlarged scale. Figs. 5 and 6 are sections of the water-tubes which lead the liquid or juice to be filtered into the filter.

Similar characters refer to similar parts throughout the several views.

1 is a reservoir which is filled with filtering materials, preferably of a cheap and durable quality, as sand, for instance. It ought to be a filtering material which is easily washed, so that it may be used repeatedly. The reservoir may have, preferably, a rectangular shape. Near the bottom of said rectangular reservoir is a horizontal or nearly horizontal layer of parallel tubes 2, arranged so that they all communicate with a horizontal chamber 3, which serves to feed them with the juice or liquid to be filtered. The said tubes may be open at both ends, and they can be fed with liquor from both ends in the same way as is indicated in the drawings at one end only. Inside the filter these tubes are split upon the whole length or provided with holes, preferably on their bottom, at 4, because of the possibility of their obstruction by the filtering material which otherwise, if the openings were not at the bottom, would easily fall into said tubes. The liquid or juice which flows through said tubes 2 is therefore distributed over the whole ground of the filter and mounts through the filtering materials at every point with nearly the same velocity; therefore with the utmost effect. Different horizontal sieves or similar horizontal partitions—like 5 and 6, for instance—through which the liquid can flow, but not the filtering material, may be arranged and may contain other filtering strata, as the case may be, for the purpose of effecting a better filtering or clearing of the liquid.

The filter is provided with a gutter 7 around its upper rim, and the filtered liquid falls over the rim into said gutter, from which it is led through tubes, like 8, to its further destination.

The filter is either open or covered with a lid 9, Fig. 1, which in some cases must be air-tight—as, for instance, if the filter works between evaporating-batteries, as often occurs in sugar-factories—the air in it being rarefied in this case.

The tubes 2, which in the drawings are placed at the bottom of the filter, may also be situated as high as possible, quite near the lowest sieves or partitions 5, and in this case the liquid does not flow from them upward, but first downward and then upward, through the filtering medium. In this case each tube 2 must be surrounded by a partition of tinplate or the like on the top and on both sides, which does not allow the liquid to flow otherwise but downward, and when the liquid has arrived on its lower rim it mounts in the filtering medium between two such vertical partitions to the upper sieves.

The bottom of the filter is shaped into funnels with walls 10, which are inclined toward their lowest points, having there openings 11, through which the sand or filtering material can fall into the injectors 12, from whence it can be thrown by a jet of water through a vertical tube 14 back into the filter, and that repeatedly, for the purpose of washing it. It will be understood that if such a washing has to be made all the horizontal sieves or partitions, like 5 6, &c., must be taken off, and the mouth 15 of the tube 14, which during the process of filtering was shut, must be opened. The jet of water is introduced into the injector 12 by the opening 18 and then is forced through the nozzle 16, which can be shut by a tube 17, which is adjusted inside the said nozzle, having the same axis. Tube 17 is prolonged far into the canal 13, and it can be withdrawn by the known arrangement of its screw-bar 20. Tube 17 is provided with openings 19, and if it is withdrawn and the nozzle 16 open water under pressure enters through the said openings 19 into the tube 17, and thus a jet of water is thrown from the mouth of the tube 17 into the tube 13, which draws the sand from 11 with it and throws it through the tube 14 and its mouth 15 back into the filter, mixing and washing it thoroughly through on its way. The sand or filtering material is finally deposited, therefore, in the reservoir 1 in a thoroughly-cleansed condition, especially if this process has been repeatedly continued, and the soiled water falls over the upper rim of the reservoir 1 into the gutter 7, from where it can be easily led off. Thus the cleansing of the filtering medium can be made automatically in a short time without having to transport its bulk from the filter to a washing machinery and back again, and, in fact, no washing machinery is needed.

I am aware that prior to my invention filters with mounting and falling streams of liquid have been invented and constructed. I therefore do not claim such a combination, broadly; but

What I claim as my invention, and desire to secure by Letters Patent, is—

1. The combination in a filtering apparatus, of a reservoir, 1, a filtering medium, practically filling such reservoir, a horizontal, or nearly horizontal layer of tubes, 2, extending over practically an entire horizontal area of the reservoir, and which have slits or openings their whole length inside the reservoir, preferably located at the bottom of the individual tubes, and a gutter exterior to, immediately below, and surrounding the upper rim of the reservoir for the reception of the clarified liquid falling over said rim.

2. The combination in a filtering apparatus, of a reservoir, 1, a filtering medium practically filling such reservoir, a horizontal, or nearly horizontal layer of tubes, 2, extending over practically an entire horizontal area of said reservoir, and which have slits or openings their whole length inside the reservoir, preferably at the bottom of the individual tubes, a series of horizontal sieve-partitions in the reservoir above the layer of tubes, and a gutter outside of, below, and surrounding the upper rim of the reservoir.

3. The combination in a filtering and self-cleansing apparatus, of a reservoir, 1, a filtering medium practically filling the same, a layer of perforated tubes for introducing the liquid to be filtered into said filtering medium, a gutter outside of, below, and surrounding the upper rim of the reservoir, a draw-off pipe leading therefrom, funnels formed in the bottom of said reservoir and having discharge-openings at their apexes, water-injectors beneath each of said openings and into which the openings discharge, and return-pipes leading from said injectors to the top of the reservoir to discharge the mingled sand and water therein.

4. The combination in a filtering and self-cleansing apparatus, of a reservoir, 1, a filtering medium practically filling the same, a layer of perforated tubes for introducing the liquid to be filtered into said filtering medium, a gutter outside of, below, and surrounding the upper rim of the reservoir, a draw-off pipe leading therefrom, removable sieve-partitions extending horizontally across the reservoir, funnels formed in the bottom of said reservoir and having discharge-openings at their apexes, water-injectors beneath each of said openings and into which the openings discharge, and return-pipes leading from said injectors to the top of the reservoir to discharge the mingled sand and water therein.

In witness whereof I have hereunto set my hand in presence of two witnesses.

JOSEF KOSTÁLEK.

Witnesses:
LADISLAV VOJÁCEK,
ADOLPH FISCHER.